(12) United States Patent
Dudar

(10) Patent No.: US 12,535,043 B2
(45) Date of Patent: Jan. 27, 2026

(54) SYSTEMS AND METHODS FOR CAPLESS REFUELING SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 18/533,959

(22) Filed: Dec. 8, 2023

(65) Prior Publication Data

US 2025/0188895 A1    Jun. 12, 2025

(51) Int. Cl.
*F02M 25/08* (2006.01)
*B60K 15/04* (2006.01)

(52) U.S. Cl.
CPC ......... *F02M 25/0809* (2013.01); *B60K 15/04* (2013.01); *B60K 2015/0419* (2013.01); *B60K 2015/0451* (2013.01)

(58) Field of Classification Search
None
See application file for complete search history.

(56) References Cited

U.S. PATENT DOCUMENTS

| | | | | |
|---|---|---|---|---|
| 9,217,402 | B2* | 12/2015 | Dudar | B60K 15/04 |
| 9,724,736 | B2* | 8/2017 | Dudar | F02M 25/0854 |
| 10,024,750 | B2 | 7/2018 | Yang et al. | |
| 11,498,101 | B1 | 11/2022 | Dudar | |
| 2014/0216563 | A1* | 8/2014 | Dudar | F02M 25/0809 |
| | | | | 137/15.04 |
| 2015/0298541 | A1* | 10/2015 | Bar | B60K 15/05 |
| | | | | 220/86.2 |
| 2016/0096427 | A1* | 4/2016 | Dudar | B60K 15/03519 |
| | | | | 137/15.04 |

* cited by examiner

*Primary Examiner* — Peter D Nolan
(74) *Attorney, Agent, or Firm* — Vincent Mastrogiacomo; McCoy Russell LLP

(57) ABSTRACT

Methods and systems are provided for capless refueling system of a vehicle. In one example, a method may include diagnosing a door seal of a capless unit of the capless refueling system. The diagnosing includes determining a condition of the door seal in response to a leak being present in an evaporative emissions system.

17 Claims, 6 Drawing Sheets

SYSTEMS AND METHODS FOR CAPLESS REFUELING SYSTEM

FIELD

The present description relates generally to methods and systems for diagnosing a capless refueling system.

BACKGROUND/SUMMARY

A vehicle may utilize a capless refueling system to increase an efficiency and convenience of refueling. The capless refueling system may include a capless unit with a port for receiving a refueling nozzle, the port configured with two pivotable flaps, hereafter flappers, that allow fuel to be added to a fuel tank of the vehicle. By precluding removal and replacing of a gas cap during refueling events, evaporative emissions may be reduced while a refueling process may be simplified.

Over time, debris, such as dust, salt, leaves, etc., may accumulate in the capless unit which may interfere with an ability of the flappers to seal the port. Fuel vapors from the fuel tank may thereby escape to the atmosphere through the degraded sealing of the flappers. Furthermore, detection of a leak at the capless unit may cause a diagnostic trouble code (DTC) to be set which may be displayed to the operator at the vehicle dash. While instructions for resolving the DTC may be included in an operating manual of the vehicle, if the operator does not locate the instructions, the DTC may progress to illuminate a malfunction indicator lamp (MIL). Observation of the MIL may prompt the operator to have the vehicle serviced, only to determine the issue does not warrant servicing.

Additionally, the DTC may be incorrect. For example, the DTC may request the operator to perform a capless cleanout procedure. However, if the leak in the capless unit is not due to the flappers, but instead to a degraded door seal, then the DTC may be repeatedly set and cause customer dissatisfaction.

Attempts to address leakage from a capless refueling system include leveraging engine vacuum to clean the capless refueling system. One example approach is shown by Dudar et al. in U.S. Pat. No. 9,724,736. Therein, if a leak is detected after a refueling event but not during the refueling event, the capless refueling system may be cleaned using engine vacuum. Engine vacuum may be communicated to the capless refueling system by closing a fuel vapor canister vent valve and opening a fuel vapor canister purge valve for a duration. By exposing the capless refueling system to engine vacuum, contaminants (e.g., debris) in a capless unit of the capless refueling system may be forced into a fuel tank, allowing the capless unit to seal.

Additionally, the cleaning of the capless unit may not clean the door seal and the leak may remain. Further, cleaning does not determine if the door seal of the capless unit is degraded.

In one example, the issues described above may be addressed by a method for diagnosing a door seal of a capless unit of a capless refueling system by generating vacuum in the capless refueling system. In this way, a source of a leak may be attributed to the door seal following the diagnostic.

As an example, flappers of the capless unit may open in response to the vacuum. If the door seal is degraded or fouled, then vacuum in an evaporative emissions system may not be maintained. This may result in the flappers opening and closing repeatedly, which may be sensed as multiple pressure inflection points, and the leak is attributed to the door seal. If the door seal is not degraded, only one inflection point may be sensed, thereby indicating a non-degraded condition of the door seal. The leak may not be attributed to the door seal if only one pressure inflection point is sensed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is shown approximately to scale.

DETAILED DESCRIPTION

Figure 1:
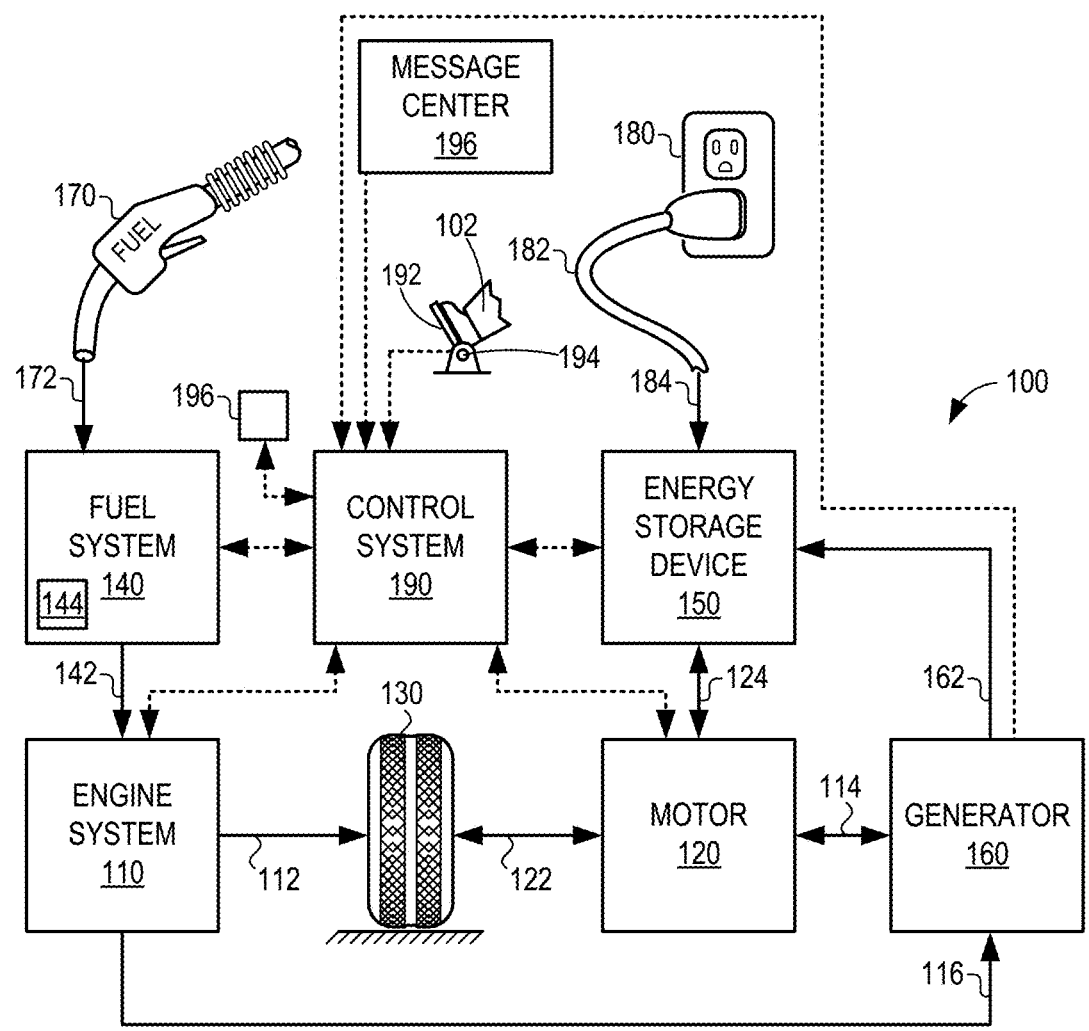
FIG. 1 shown an example of a vehicle system in which a capless refueling system may be implemented.
Figure 2:
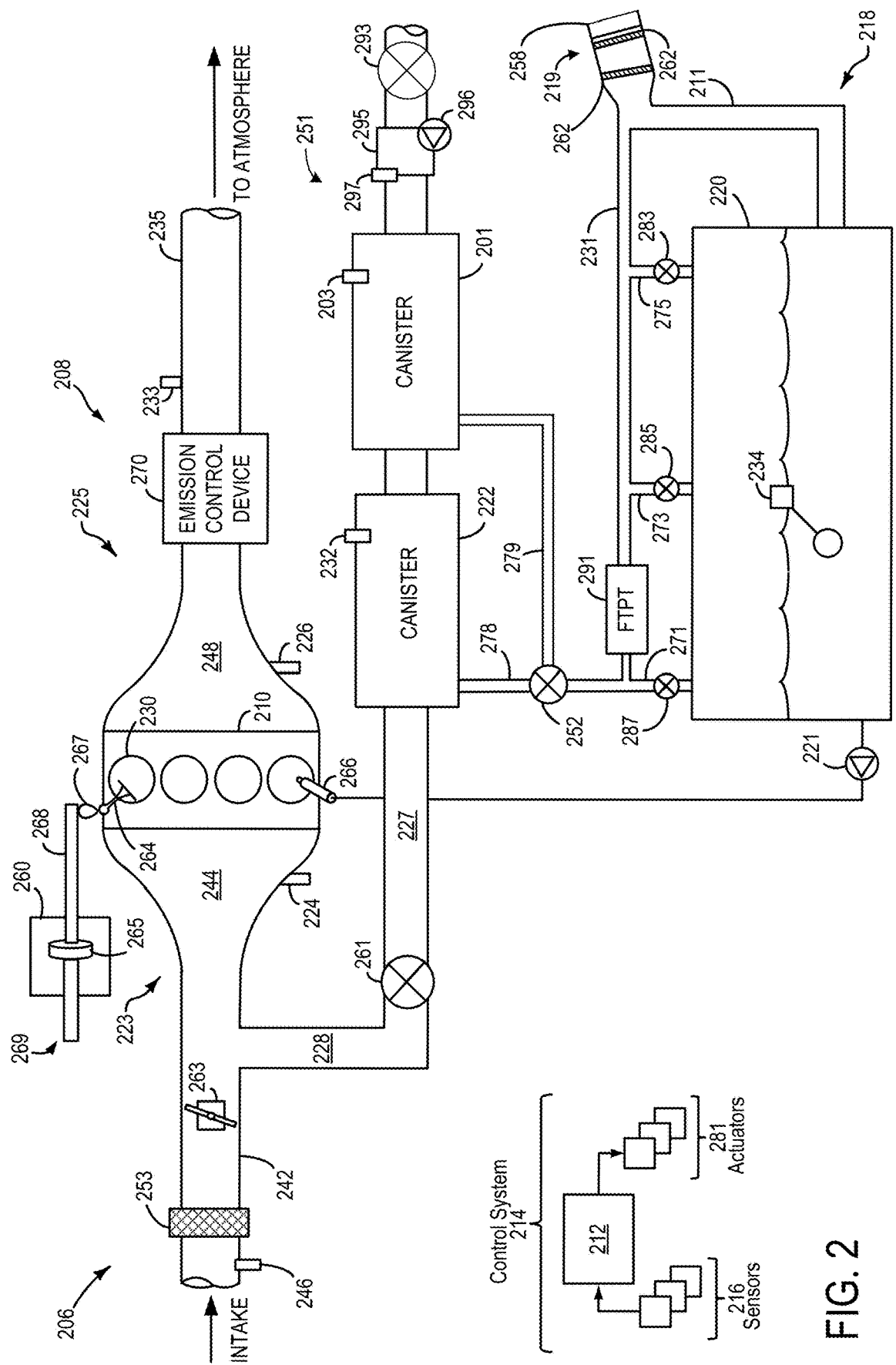
FIG. 2 shows an example of an evaporative emissions control (Evap) system of an engine system.
Figure 3:
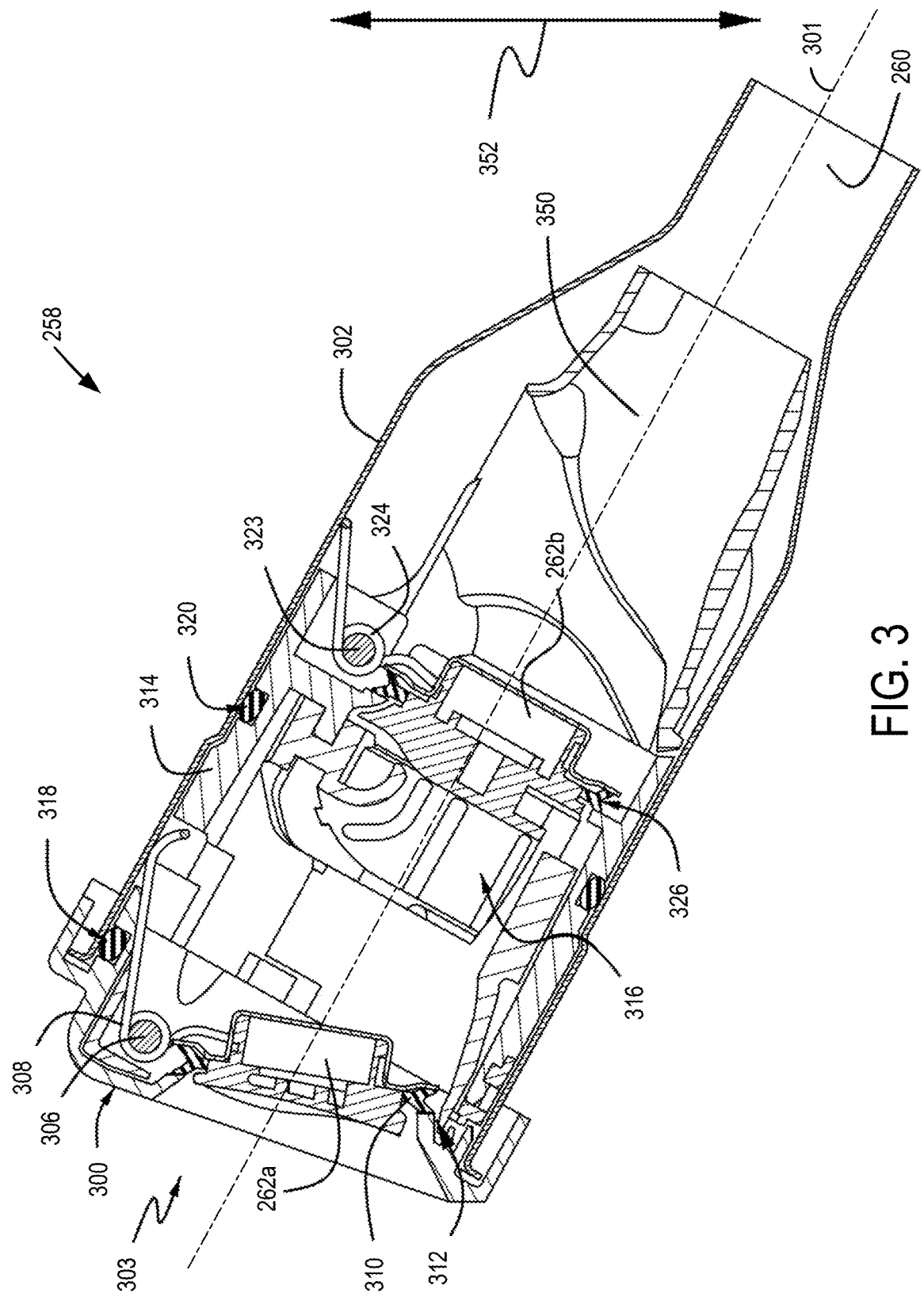
FIG. 3 shows an example of a capless unit of the capless refueling system.
Figure 4:
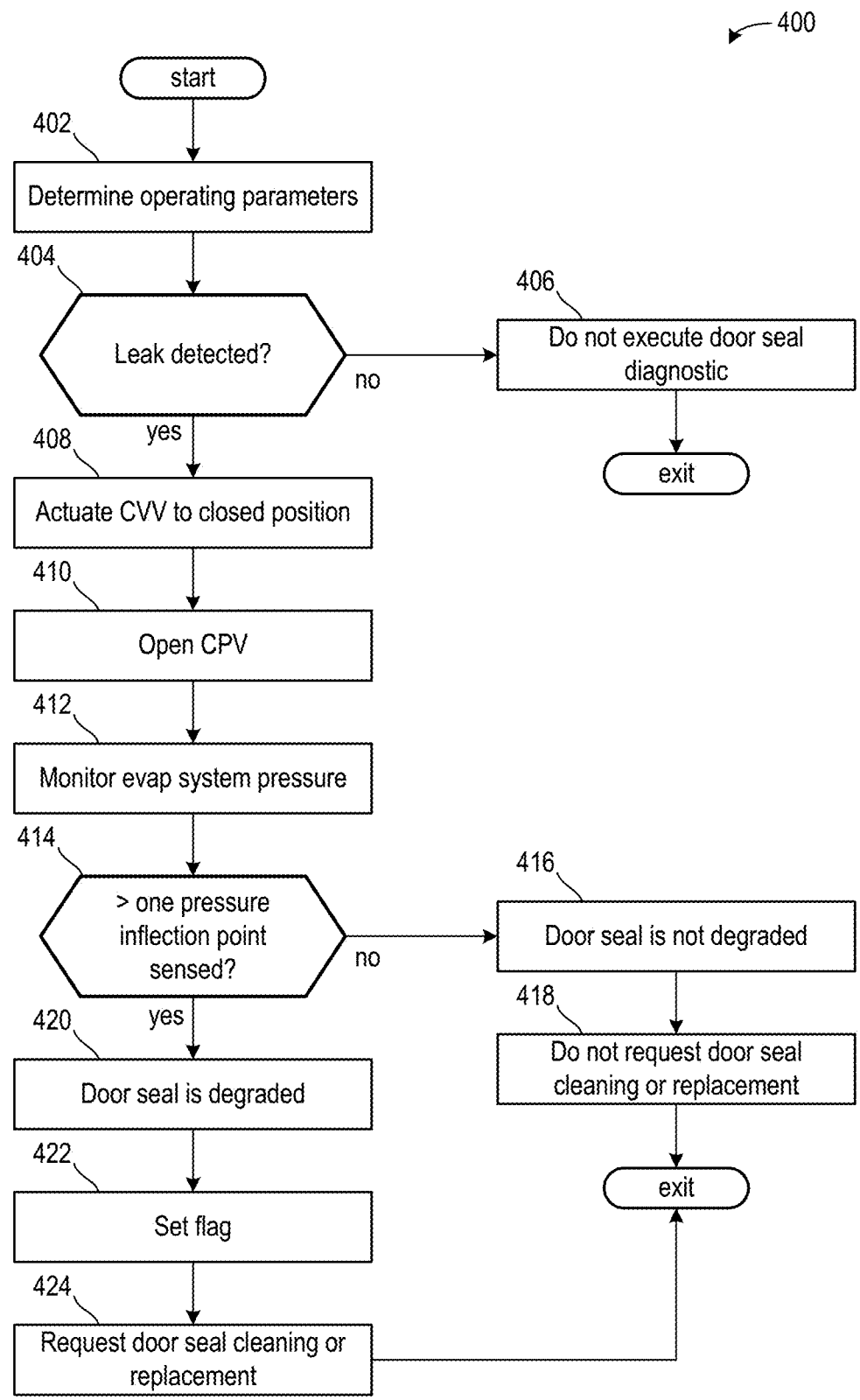
FIG. 4 shows a method for executing a diagnostic of the capless unit.
Figure 5:
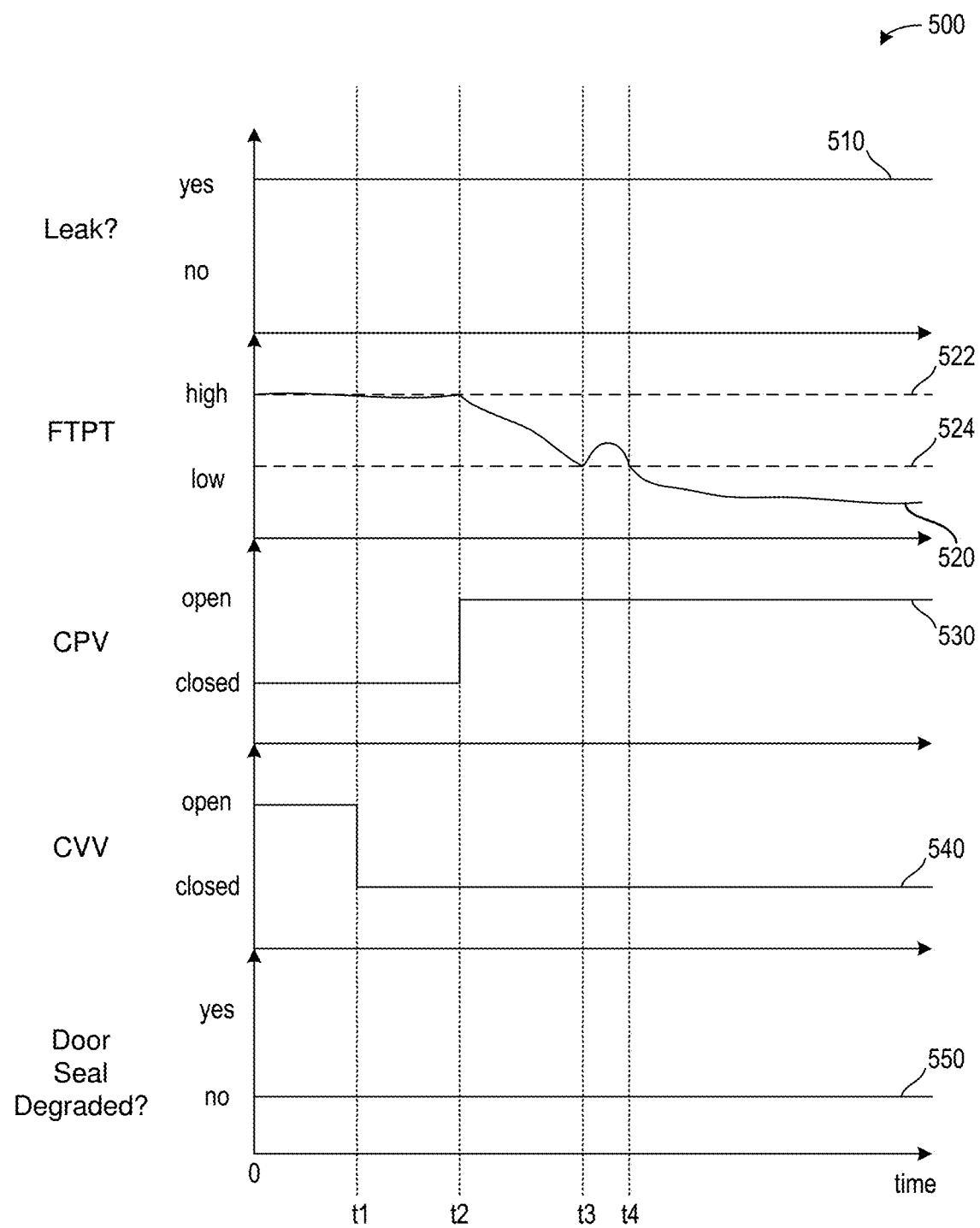
FIG. 5 shows a graph illustrating an operating sequence of a door seal passing the diagnostic.
Figure 6:
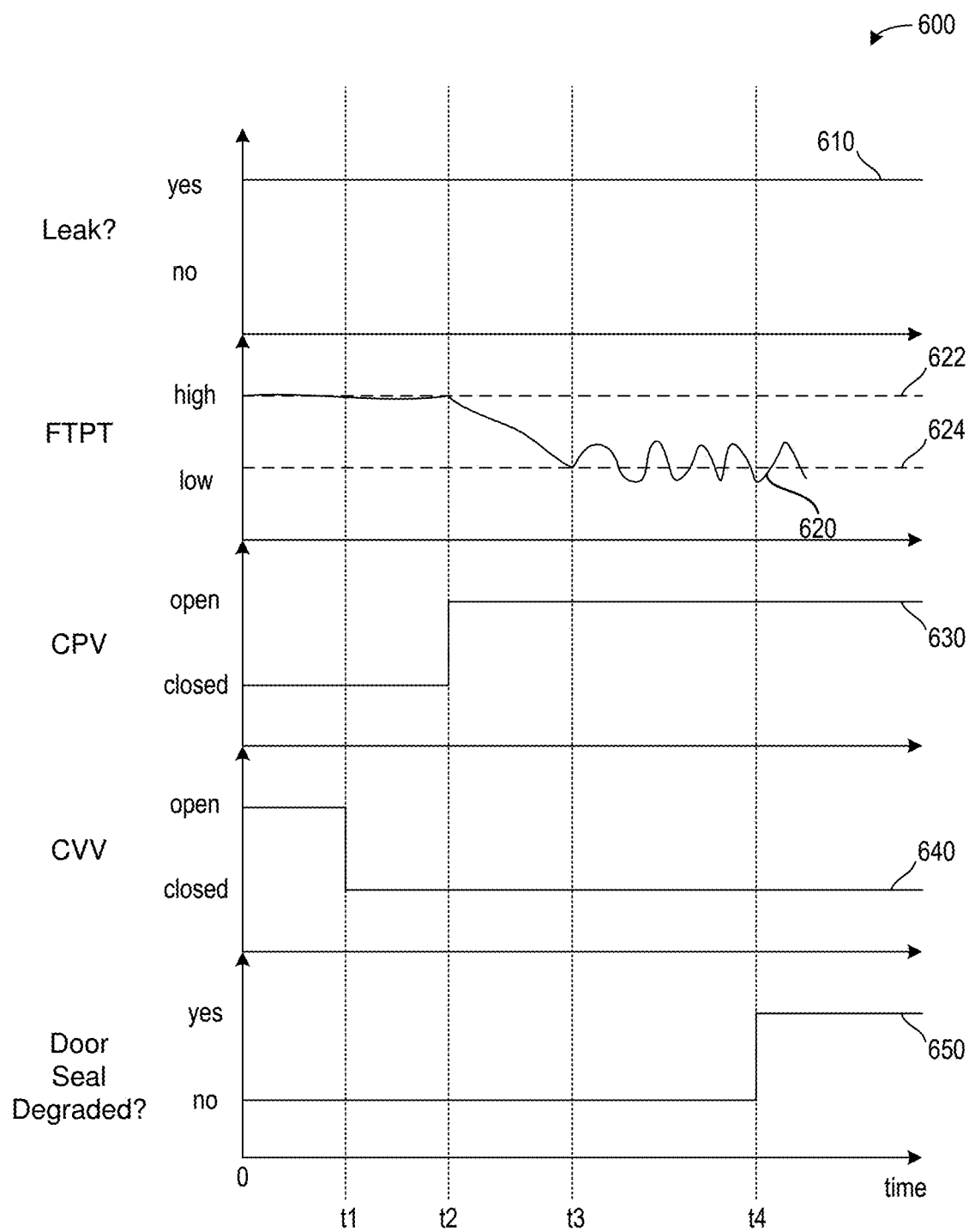
FIG. 6 shows a graph illustrating an operating sequence of the door seal not passing the diagnostic.

The following description relates to systems and methods for a capless refueling system. The capless refueling system may be used in a vehicle system which relies on fuel combustion at an engine for propulsion. An example of such a vehicle system is depicted in FIG. 1. The engine may include an evaporative emissions control (Evap) system, as shown in FIG. 2. An example of the capless unit is illustrated in FIG. 3. FIG. 4 shows a method for executing a diagnostic of the capless unit. FIG. 5 shows a graph illustrating an operating sequence of a door seal passing the diagnostic. FIG. 6 shows a graph illustrating an operating sequence of the door seal not passing the diagnostic.

FIGS. 2-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, it illustrates an example vehicle system 100. Vehicle system 100 includes a fuel burning engine system 110 and a motor 120. As a non-limiting example, engine system 110 is an internal combustion engine and motor 120 is an electric motor. Motor 120 may be configured to utilize or consume a different energy source than engine system 110. For example, engine system 110 may consume a liquid fuel (e.g., gasoline) to produce an engine output while motor 120 may consume electrical energy to produce a motor output. As such, a vehicle system 100 may be referred to as a hybrid electric vehicle (HEV).

Vehicle system 100 may utilize a variety of different operational modes depending on operating conditions encountered by the vehicle propulsion system. Some of these modes may enable engine system 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine system 110 is deactivated.

During other operating conditions, engine system 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine system 110 may be operated by combusting fuel received from fuel system 140 as indicated by arrow 142. For example, engine system 110 may be operated to propel the vehicle via drive wheel 130 as indicated by arrow 112 while motor 120 is deactivated. During other operating conditions, both engine system 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine system 110 may propel the vehicle via a second set of drive wheels.

In other embodiments, vehicle system 100 may be configured as a series type vehicle propulsion system, whereby the engine does not directly propel the drive wheels. Rather, engine system 110 may be operated to power motor 120, which may in turn propel the vehicle via drive wheel 130 as indicated by arrow 122. For example, during select operating conditions, engine system 110 may drive generator 160, as indicated by arrow 116, which may in turn supply electrical energy to one or more of motor 120 as indicated by arrow 114 or energy storage device 150 as indicated by arrow 162. As another example, engine system 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine system 110 as indicated by arrow 142. Still other suitable fuels or fuel blends may be supplied to engine system 110, where they may be combusted at the engine to produce an engine output. The engine output may be utilized to propel the vehicle as indicated by arrow 112 or to recharge energy storage device 150 via motor 120 or generator 160.

Fuel system 140 may periodically receive fuel from a fuel source residing external to the vehicle. As a non-limiting example, vehicle system 100 may be refueled by receiving fuel via a fuel dispensing device 170 as indicated by arrow 172. In some embodiments, fuel tank 144 may be configured to store the fuel received from fuel dispensing device 170 until it is supplied to engine system 110 for combustion. In some embodiments, a control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

In one example, as described further below, fuel system 140 may include a capless refueling system, as shown in FIG. 2. The capless refueling system may include a capless unit, as illustrated in detail in FIG. 3, configured to receive and interface with the fuel dispensing device 170. The capless unit may include at least two pivotable flaps, or flappers, arranged in a receiving port of the capless unit, the flappers configured to seal the receiving port and fuel tank 144 from the surrounding atmosphere. The fuel dispensing device 170 may be inserted into the receiving port of the capless unit to deliver fuel to fuel tank 144. For example, as the fuel dispensing device 170 is pushed into the receiving port, a force may be exerted on the flappers by the fuel dispensing device 170, causing the flappers to pivot towards inner walls of the receiving port to accommodate a positioning of the fuel dispensing device 170 within the receiving port. In some instances, debris may enter or accumulate at the capless unit, inhibiting an ability of the flappers to seal and a flag may be set in response. In some examples, the flag may be set when a door seal of the capless unit is degraded. A diagnostic of the door seal is described in greater detail below.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine system 110, motor 120, fuel system 140, energy storage device 150, and generator 160. For example, control system 190 may receive sensory feedback information from one or more of engine system 110, motor 120, fuel system 140, energy storage device 150, and generator 160. Further, control system 190 may send control signals to one or more of engine system 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a friction pedal and/or a power pedal.

Energy storage device 150 may periodically receive electrical energy from a power source 180 residing external to the vehicle (e.g., not part of the vehicle) as indicated by arrow 184. As a non-limiting example, vehicle system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that is not included in the vehicle. In this way, motor 120 may propel the vehicle by utilizing an energy source other than the fuel utilized by engine system 110.

In one example, the vehicle control system 190 may be coupled to a network such as a cloud-based network. In addition, the vehicle may be coupled to a remote server and a controller of one or more other vehicles. Additionally, the vehicle control system 190 may be coupled to a mobile device of the operator via cloud-based communication and so messages pertaining to engine operation or vehicle system status may be communicated to the driver though the operator's mobile device.

FIG. 2 shows a schematic depiction of a prior art example of a vehicle system 206. The vehicle system 206 includes an engine system 208 coupled to an evaporative emissions control system 251 and a fuel system 218. Evaporative emissions control system 251 (also termed, evaporative emissions system 251) includes a first canister 222 and a second canister 201 which may be used to capture and store fuel vapors. While only two canisters are illustrated, the evaporative emission control system 251 may include three or more canisters. In some examples, vehicle system 206 may be a hybrid electric vehicle system, such as the vehicle propulsion system 100 of FIG. 1. As such, engine 210 may be identical to engine 110 of FIG. 1 while control system 214 of FIG. 2 may be the same as control system 190 of FIG. 1.

The engine system 208 may include an engine 210 having a plurality of cylinders 230. The engine 210 includes an engine intake 223 and an engine exhaust 225. The engine intake 223 includes a throttle 263 fluidly coupled to the intake manifold 244. Fresh intake air enters intake passage 242 and flows through air filter 253. Air filter 253 positioned in the intake passage 242 may clean intake air before the intake air is directed to the intake manifold 244. Cleaned intake air exiting the air filter 253 may stream past throttle 263 (also termed intake throttle 263) into intake manifold 244 via intake passage 242. As such, intake throttle 263 when fully opened may enable a higher level of fluidic communication between intake manifold 244 and intake passage 242 downstream of air filter 253. An amount of intake air provided to the intake manifold 244 may be controlled via throttle 263 based on engine conditions. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Each cylinder 230 may be serviced by one or more valves. In the present example, each cylinder 230 includes a corresponding intake valve 264 and an exhaust valve (not shown). Each intake valve 264 may be held at a desired position via a corresponding spring. Engine system 208 further includes one or more camshafts 268 for operating intake valve 263. In the depicted example, intake camshaft 268 is coupled to intake valve 264 and can be actuated to operate intake valve 264. In some embodiments, where the intake valve of a plurality of cylinders 230 are coupled to a common camshaft, intake camshaft 268 can be actuated to operate all the intake valves of all the coupled cylinders.

Intake valve 264 is actuatable between an open position that allows intake air into the corresponding cylinder and a closed position substantially blocking intake air from the cylinder. Intake camshaft 268 may be included in intake valve actuation system 269. Intake camshaft 268 includes intake cam 267 which has a cam lobe profile for opening intake valve 264 for a defined intake duration. The lobe profile may affect cam lift height, cam duration, and/or cam timing. A controller, such as controller 212, may be able to switch the intake valve duration by moving intake camshaft 268 longitudinally and switching between cam profiles.

It will be appreciated that the intake and/or exhaust camshafts may be coupled to cylinder subsets, and multiple intake and/or exhaust camshafts may be present. Intake valve actuation system 269 may further include push rods, rocker arms, tappets, etc. As such, the intake valve actuation system may include a plurality of electromechanical actuators. Such devices and features may control actuation of the intake valve 264 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 230 may each have more than one intake valve. In still other examples, each intake valve 264 of one or more cylinders may be actuated by a common camshaft. Further still, in some examples, some of the intake valves 264 may be actuated by their own independent camshaft or other device.

Engine system 208 may include variable valve timing systems, for example, variable cam timing VCT system 260. As such, VCT system 260 may be operatively and communicatively coupled to the intake valve actuation system 269. VCT system 260 may include an intake camshaft phaser 265 coupled to the common intake camshaft 268 for changing intake valve timing. VCT system 260 may be configured to advance or retard valve timing by advancing or retarding cam timing and may be controlled by controller 212. In some embodiments, valve timing such as intake valve closing (IVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 260. As such, the valve actuation systems described above may enable closing the intake valves to block fluid flow therethrough, when desired.

Though not shown in FIG. 2, vehicle system 206 may also include an exhaust gas recirculation (EGR) system for routing a desired portion of exhaust gas from the exhaust passage 235 to the intake manifold 244 via an EGR passage. The amount of EGR provided may be varied by controller 212 via adjusting an EGR valve in the EGR passage. By introducing exhaust gas to the engine 210, the amount of available oxygen for combustion is decreased, thereby reducing combustion flame temperatures and reducing the formation of $NO_x$, for example.

Fuel system 218 may include a fuel tank 220 coupled to a fuel pump system 221. The fuel pump system 221 may include one or more pumps for pressurizing fuel delivered to the injectors of engine 210, such as the example injector 266. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol amounts, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to evaporative emissions control system 251, which includes the first fuel vapor canister 222 and the second fuel canister 201, via vapor recovery line 231. The first fuel vapor canister 222 may also be simply termed first canister 222 and the second fuel vapor canister 201 may be termed second canister 201 herein. Fuel vapors stored in first canister 222 and the second canister 201 may be purged to the engine intake 223 at a later time. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219 (or refueling system 219). In some examples, fuel filler system may include a capless unit 258 for sealing off the fuel filler system from the atmosphere. Refueling system 219 is coupled to fuel tank 220 via a fuel filler pipe or neck 211.

The capless unit 258 may be configured to receive a fuel dispensing device, such as the fuel dispensing device 170 of FIG. 1, without demanding removal of a cap. Furthermore, the capless unit 258 enables sealing of fuel system 140 from air external to fuel system 140, e.g., air outside of and surrounding fuel system 140. For example, the capless unit 258 may include two pivotable flaps, e.g., flap valves or flappers, 262 arranged in a receiving port of the capless unit 258, which yield to pressure applied by the fuel dispensing device by pivoting to allow insertion of a nozzle of the fuel dispensing device in the receiving port. The flappers 262 may be spring-loaded such that the flappers 262 close and seal the capless unit 258 when the fuel dispensing device is removed.

Evaporative emissions control system 251 may include one or more emissions control devices, such as one or more fuel vapor canisters filled with an appropriate adsorbent. The canisters are configured to temporarily trap fuel vapors (including vaporized hydrocarbons) during fuel tank refilling operations and "running loss" (that is, fuel vaporized during vehicle operation). In one example, the adsorbent used is activated charcoal. Evaporative emissions system 251 may further include a canister ventilation path or vent line 227 which may route gases out of the canister 222 to the atmosphere when storing, or trapping, fuel vapors from fuel system 218.

Vent line 227 may allow fresh air to be drawn into canister 222 when purging stored fuel vapors from first canister 222 and second canister 201 to engine intake 223 via purge line 228 and canister purge valve 261 (also termed, purge valve 261). For example, purge valve 261 may be normally closed but may be opened during certain conditions so that vacuum from engine intake manifold 244 is provided to the fuel vapor canister 222 for purging.

FTIV 252 may be positioned between the fuel tank 220, the first canister 222, and the second canister 201 within conduit 278. FTIV 252 may be a normally closed valve, that when opened, allows for the venting of fuel vapors from fuel tank 220 to only first canister 222 via conduit 278, only second canister 201 via conduit 279, or both. Fuel vapors may be stored within the first canister 222 and the second canister 201, stripped off fuel vapors, may then be vented to atmosphere via vent line 227. Fuel vapors stored in first canister 222 and the second canister 201 may be purged along purge line 228 to engine intake 223 via canister purge valve 261 at a later time when purging conditions exist. As such, FTIV 252 when closed may isolate and seal the fuel tank 220 from the evaporative emissions system 251. It will be noted that certain vehicle systems may not include FTIV 252.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open FTIV 252 while closing canister purge valve (CPV) 261 to direct refueling vapors into first and second canisters and preventing fuel vapors from being directed into the intake manifold.

As another example, the fuel system may be operated in a refueling mode (e.g., when fuel tank refueling is requested by a vehicle operator), wherein the controller 212 may open FTIV 252, while maintaining CPV 261 closed, to depressurize the fuel tank before allowing fuel to be added therein. As such, FTIV 252 may be kept open during the refueling operation to allow refueling vapors to be stored in the canister. After refueling is completed, the FTIV may be closed.

As yet another example, the fuel system may be operated in a canister purging mode (e.g., after an emission control device light-off temperature has been attained and with the engine running), wherein the controller 212 may open CPV 261 while closing FTIV 252. Herein, the vacuum generated by the intake manifold of the operating engine may be used to draw fresh air through vent line 227 and through the first canister 222 and the second canister 201 to purge the stored fuel vapors into intake manifold 244. In this mode, the purged fuel vapors from the canister are combusted in the engine. The purging may be continued until the stored fuel vapor amount in the canister is below a threshold. The FTIV 252 may be closed during the purging mode.

An evaporative leak check module (ELCM) 295 may be coupled to the vent line 227 on an opposite side of the canister 201 from the CPV 261. In this way, the ELCM 295 may be positioned between the canister 201 and atmosphere. The ELCM 295 may be used to diagnose leaks in the Evap system, particularly when vacuum at the intake manifold 244 is not available or equal to a determined value. For example, the ELCM 295 may include a vacuum pump 296, allowing the ELCM 295 to provide a reference check of pressure in fuel system 218 when the vacuum pump 296 is activated to draw pressure on a reference orifice of the ELCM 295. A resulting pressure measured by an ELCM pressure sensor 297 at the reference orifice may be used as a reference for detecting leaks.

A canister vent valve (CVV) 293 may be optionally positioned downstream of the ELCM 295 between the ELCM 295 and atmosphere. The CVV 293 may be configured to seal the evaporative emissions system from atmosphere when in a closed position. The CVV 293 may vent gases from the evaporative emissions system to atmosphere when in an open position. In one example, the CVV 293 may be integrated into the ELCM 295 as a changeover valve.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include manifold absolute pressure (MAP) sensor 224, barometric pressure (BP) sensor 246, exhaust gas sensor 226 located in exhaust manifold 248 upstream of the emission control device, temperature sensor 233, fuel tank pressure sensor 291 (also termed a fuel tank pressure transducer or FTPT), and canister temperature sensors 232, 203. Other sensors such as pressure, temperature, air/fuel ratio, and composition sensors may be coupled to various locations in the vehicle system 206. As another example, the actuators may include CPV 261, fuel injector 266, throttle 263, FTIV 252, and fuel pump 221. The control system 214 may include a controller 212. The controller may receive input data from the various sensors, process the input data, and trigger the actuators in response to the processed input data based on instruction or code programmed therein corresponding to one or more routines.

The controller 212 receives signals from the various sensors of FIG. 2 and employs the various actuators of FIG. 2 to adjust engine operation based on the received signals and instructions stored on a memory of the controller. For example, adjusting the canister purge valve may include adjusting an actuator of the canister purge valve to adjust a flow rate of fuel vapors therethrough. As such, controller 212 may communicate a signal to the actuator (e.g., canister purge valve solenoid) of the canister purge valve based on a desired purge flow rate. Accordingly, the canister purge valve solenoid may be opened (and pulsed) at a specific duty cycle to enable a flow of stored vapors from canisters to intake manifold 244 via purge line 228.

The capless unit 258 of FIG. 2 is shown in greater detail in FIG. 3. Therein, the capless unit 258 has a generally cylindrical geometry with a central axis 301. The capless unit 258 has a cover 300 surrounding an inner volume of the capless unit 258 that forms a receiving port or receptacle 303 of the capless unit 258. As described above, the receiving receptacle 303 is configured to receive a nozzle of fuel dispensing device, such as the fuel dispensing device 170 of FIG. 1. The cover 300 is configured to enclose components in the assembly. The capless unit 258 further includes an external housing 302 configured to at least partially enclose various internal components of the capless unit 258.

The capless unit 258 further includes a first, upstream flapper 262a of the flappers 262 of FIG. 2. The upstream flapper 262a includes a hinge 306. The upstream flapper 262a is inset from the cover 300. A preloaded upstream spring 308 may be coupled to the upstream flapper 262a and the external housing 302. The preloaded upstream spring 308 coupled to the upstream flapper 262a may provide a return force to the door when opened. The upstream spring 308 is configured to provide a return force when the upstream flapper 262a is depressed via the nozzle of the fuel dispensing device. In this way, the upstream flapper 262a may close after the nozzle is removed during a refueling event. Thus, the upstream flapper 262a automatically closes without assistance from a refueling operator. As a result, the refueling process is simplified.

A seal 310 may be attached to the upstream flapper 262a. Specifically, the seal 310 may extend around the periphery of the upstream flapper 262a, in some examples. When the upstream flapper 262a is in a closed position the seal 310 may be in face-sharing contact with the cover 300. In this way, the evaporative emissions from the capless unit 258 are reduced. Herein, the seal 310 may be referred to as a door seal 310 interchangeably herein.

The capless unit 258 further includes a locking lip 312. The locking lip 312 may be configured to receive a portion of the nozzle. In some examples, the locking lip 312 may be provided around at least 100° of an inner circumference of the capless unit 258. The locking lip 312 may influence a positioning and angle of the nozzle axis spout during refueling and therefore may affect filling performance.

The capless unit 258 also includes an internal housing 314. Walls of the internal housing 314 may define a nozzle enclosure configured to receive the nozzle. The internal housing 314 may include a nozzle stop actuator 316 configured to actuate a portion of the nozzle that initiates fuel flow from the nozzle.

An upstream body seal 318 and a downstream body seal 320 may be provided in the capless unit 258 to seal the external housing 302 and various internal components in the capless unit 258. Specifically, the upstream and downstream body seals (318 and 320) are configured to extend between the external housing 302 and the internal housing 314. The upstream body seal 318 and/or downstream body seal 320 may be an O-ring, in some examples.

The capless unit 258 further includes a second, downstream flapper 262b of the flappers 262 of FIG. 2, the downstream flapper 262b positioned downstream of the upstream flapper 262a and the nozzle stop actuator 316. The downstream flapper 262b includes a hinge 323 and has a preloaded downstream spring 324 coupled thereto. The preloaded downstream spring 324 is coupled to the downstream flapper 262b providing a return force to the downstream flapper 262b when opened. The downstream spring 324 is also coupled to the external housing 302. The downstream spring 324 is configured to provide a return force to the downstream flapper 262b when the downstream flapper 262b is in an open position. The downstream flapper 262b may also include a seal 326 (e.g., flap seal). The seal 326 may be positioned around a periphery of the downstream flapper 262b, in some examples. The downstream flapper 262b enables the evaporative emissions during the refueling process to be reduced by sealing the Evap system (e.g., the Evap system 251 of FIG. 2), from surrounding atmosphere. The upstream flapper 262a therefore reinforces sealing of the Evap system and may be configured as a backup to the downstream flapper 262b. The downstream flapper 262b is arranged perpendicular to the fuel flow when closed, in the depicted example. However, other orientations of the downstream flapper 262b are possible.

The capless unit 258 may be positioned in a number of configurations in the vehicle system 100, shown in FIG. 1. In one example, the capless unit 258 has a downward gradient. In other words, the upstream flapper 262a is positioned vertically above flow guide 350 with regard to gravitational axis 352. In this way, fuel flow is assisted via gravity during refueling operation.

The capless unit 258 includes flow guide 350 which is arranged downstream of downstream flapper 262b. The capless unit 258 further includes the filler pipe 260 of FIG. 2. Flow guide 350 may be at least partially enclosed by the filler pipe 260 which is in fluidic communication with the fuel tank, e.g., fuel tank 144 as shown in FIG. 2.

The capless unit 258 may further include a vacuum relief mechanism (not shown). The vacuum relief mechanism may allow a passage in the capless unit 258 to open under a threshold vacuum, allowing for the venting of the fuel tank to atmosphere. In this way, an excess of fuel tank vacuum will cause the vacuum relief mechanism to vent to atmosphere, circumventing vacuum over an upper determined value. The vacuum threshold for activating the vacuum relief mechanism may be set at −18 inH$_2$O, for example, or at a suitable threshold depending on the fuel tank design and configuration. The vacuum threshold may also be set at a level greater (e.g., a stronger vacuum) than vacuum conditions used for fuel tank leak testing using the ELCM, e.g., the ELCM 295 of FIG. 2. In this way, an ELCM testing cycle may not trigger the vacuum relief mechanism (which may cause a false no pass result), but such that naturally occurring tank vacuum above a threshold may be relieved.

In some embodiments, the vacuum relief mechanism may not be an additional hardware component within the capless unit 258. Rather, preloaded upstream spring 308 and preloaded downstream spring 324 may be set with a tension such that fuel tank vacuum above a threshold (e.g. −18 inH$_2$O) will cause upstream flapper 262a and downstream flapper 262b to open, venting the fuel tank to atmosphere. In some embodiments, preloaded upstream spring 308 and preloaded downstream spring 324 may be solenoid activated springs under control of the controller, e.g., the controller 212 of FIG. 2. When fuel tank vacuum increases above the threshold vacuum (as determined by FTPT 291 of FIG. 2, for example) the controller may deactivate the solenoids, allowing for upstream flapper 262a and downstream flapper 262b to open, venting the fuel tank to atmosphere. Upon fuel tank vacuum reaching a threshold level, the solenoids may be re-activated.

Turning now to FIG. 4, it shows a method 400 for performing a diagnostic of the door seal of the capless unit in response to a leak being detected. Instructions for carrying out method 400 may be executed by a controller based on instructions stored on a memory (e.g., non-transitory memory) of the controller and in conjunction with signals received from sensors of the engine system, such as the sensors described above with reference to FIGS. 1 and 2. The controller may employ engine actuators of the engine system to adjust engine operation, according to the method described below.

The method 400 begins at 402, which includes determining operating parameters. Operating parameters may include one or more of a manifold vacuum, an Evap system pressure, a fuel tank pressure, and an air/fuel ratio. The Evap system pressure may be determined based on feedback from one or more of the FTPT or the ELCM pressure. The fuel tank pressure may be determined based on feedback from the FTPT.

At 404, the method 400 may include determining if a leak is detected. A leak may be detected if a pressure of the Evap system is not equal to a determined threshold. For example, if the Evap system is expected to be equal to a threshold vacuum, and the Evap system is pressure is greater than the threshold vacuum, then a leak may be present. As another example, if a pressure rise is expected in the fuel tank or the Evap system, and the pressure does not increase to a threshold pressure, then a leak may be present. In one example, following a refueling event, a leak may be detected if a fuel tank pressure does not increase to a threshold pressure. As another example, ambient temperature changes may be used during engine off conditions to determine if a leak is present.

If a leak is not detected (e.g., 404 is no), then at 406, the method 400 may include not executing the door seal diagnostic. A leak is not present and diagnosing the door seal is not requested. The door seal is not degraded or fouled.

If a leak is detected (e.g., 404 is yes), then it may be desired to determine if the door seal is the source of the leak and a diagnostic may be initiated. By diagnosing the door seal, prompts (e.g., DTC) requesting that the vehicle operator clean the capless unit may be corrected.

The diagnostic may begin at 408, which includes actuating the CVV to the closed position. As such, the Evap system may be sealed from atmosphere.

At 410, the method 400 may include opening the CPV. The intake manifold may be fluidly coupled to the Evap system. In one example, vacuum from the intake manifold may flow to the Evap system.

In some examples, such as embodiments where an ELCM is included in the Evap system, the CPV may be maintained closed and vacuum may be generated by the ELCM. The vacuum may extend through the Evap system and reduce a pressure of the capless unit. As such, the diagnostic may be used in hybrid and non-hybrid vehicles.

At 412, the method 400 may include monitoring the Evap system pressure. The Evap system pressure may be monitored via the FTPT in one example. The Evap system pressure may decrease after being fluidly coupled to the intake manifold. In one example, the Evap system pressure may decrease from an upper pressure to a lower pressure. The upper pressure and the lower pressure may be non-zero values. In one example, the upper pressure is equal to atmospheric pressure and the lower pressure is equal to a determined negative pressure.

At 414, the method 400 may include determining if greater than one pressure inflection point is sensed. The pressure inflection point may occur due to a volume change in the Evap system due to the flappers of the capless unit opening. Multiple pressure inflection points may occur due to the flappers opening repeatedly when vacuum leaks through the door seal and is then reestablished.

If only one pressure inflection point is sensed (e.g., not greater than one pressure point is sensed) (e.g., 414 is no), then at 416, the method 400 may include determining the door seal is not degraded.

At 418, the method 400 may include not requesting door seal cleaning or replacement. In one example, when the diagnostic for the door seal is passed, then the leak may not be attributed to the door seal and the system may execute other diagnostic routines to determine a source of the leak.

If more than pressure inflection point is sensed (e.g., 414 is yes), then at 420, the method 400 may include determining the door seal of the capless unit is degraded.

At 422, the method 400 may include setting a flag (e.g., DTC). The flag may be stored in memory and accessible via a diagnostic check device used by a technician. The flag may indicate to the technician, via a diagnostic code received by the diagnostic check device, indicating service of the door seal is requested. In one example, service may include replacing the door seal.

At 424, the method 400 may include requesting the door seal be cleaned or replaced. The request may be sent to the vehicle operator via text, email, phone call, or an alert via a vehicle communication system. For example, a message may be displayed on a screen of an infotainment system of the vehicle. The flag may be removed once the door seal is cleaned or replace and the leak is no longer detected.

In one example, the method may further include automatically cleaning the capless unit in response to the door seal leaking. In one example, additional vacuum from the ELCM and/or the intake manifold may be directed to the capless unit. Additionally or alternatively, high pressure air may be directed from turbocharger and/or a separate booster to the capless unit. By flowing vacuum and/or high pressure air to the capless unit, the door seal may be automatically cleaned without input from a vehicle operator.

Turning now to FIG. 5, it shows a graph 500 illustrating the diagnostic of FIG. 4 executed with the systems of FIGS. 1-3. Plot 510 illustrates if a leak in the Evap system is detected. Plot 520 illustrates feedback from the FTPT. Dashed line 522 illustrates a threshold pressure and dashed line 524 illustrates a threshold vacuum. Plot 530 illustrates a position of the CPV. Plot 540 illustrates a position of the CVV. Plot 550 illustrates if a door seal is degraded. Time increases from a left to a right side of the figure.

Prior to t1, a leak is detected. The leak may be detected during an engine off condition, such as before and after a refueling event and/or based on a diurnal vapor pressure rise or drop. Additionally or alternatively, the ELCM may be used to determine if a leak is present in the Evap system. The ELCM may apply a pressure to the Evap system and if a determined pressure is not reached, then a leak may be present.

At t1, the CVV is commanded closed. Between t1 and t2, the Evap system is sealed from atmosphere.

At t2, the CPV is commanded open. Between t2 and t3, the Evap system is fluidly coupled to an intake manifold. The pressure of the Evap system may decrease from the threshold pressure toward the threshold vacuum. In one example, the threshold pressure is based on atmosphere and the threshold vacuum is based on a negative pressure, such as less than −10 $inH_2O$, or less than −20 $inH_2O$.

At t3, the pressure of the Evap system is equal to the threshold vacuum. Between t3 and t4, an inflection point occurs. The inflection point may include an increase in pressure due to a volume increase as the flappers of the capless unit open. The vacuum may be reestablished.

At t4, the pressure of the Evap system is equal to the threshold vacuum. After t4, the pressure of the Evap system is less than the threshold vacuum. As such, only one inflection point is sensed, thereby indicating the vacuum is maintained and the flappers are held in the open position. The door seal is determined to not be degraded.

Turning now to FIG. 6, it shows a graph 600 illustrating the diagnostic of FIG. 4 executed with the systems of FIGS. 1-3. Plot 610 illustrates if a leak in the Evap system is detected. Plot 620 illustrates feedback from the FTPT. Dashed line 622 illustrates a threshold pressure and dashed line 624 illustrates a threshold vacuum. Plot 630 illustrates a position of the CPV. Plot 640 illustrates a position of the CVV. Plot 650 illustrates if a door seal is degraded. Time increases from a left to a right side of the figure.

Prior to t1, a leak is detected. The leak may be detected during an engine off condition, such as before and after a refueling event and/or based on a diurnal vapor pressure rise or drop. Additionally or alternatively, the ELCM may be used to determine if a leak is present in the Evap system. The ELCM may apply a pressure to the Evap system and if a determined pressure is not reached, then a leak may be present.

At t1, the CVV is commanded closed. Between t1 and t2, the Evap system is sealed from atmosphere.

At t2, the CPV is commanded open. Between t2 and t3, the Evap system is fluidly coupled to an intake manifold. The pressure of the Evap system may decrease from the threshold pressure toward the threshold vacuum. In one example, the threshold pressure is based on atmosphere and the threshold vacuum is based on a negative pressure, such as less than −10 $inH_2O$, or less than −20 $inH_2O$.

At t3, the pressure of the Evap system is equal to the threshold vacuum. Between t3 and t4, a plurality of inflections points occurs. Each inflection point may include an increase in pressure due to a volume increase as the flappers of the capless unit open. Multiple inflection points may occur due to vacuum leaking through the door seal of the capless unit. By doing this, the flappers may oscillate between the open and closed position.

At t4, the door seal is determined to be degraded in response to the plurality of inflection points. In one example, the door seal may be determined to be degraded in response to a determined number of inflection points sensed. For example, the door seal is determined to be degraded in response to greater than one inflection point being sensed, or greater than two inflection points being sensed.

The technical effect of diagnosing a door seal of a capless unit may include increasing customer satisfaction by reducing a frequency of customer maintenance requests. The diagnostic may determine if the door seal is a source of a leakage. If the door seal is the culprit, then the vehicle operator may be requested to clean or replace the door seal. By doing this, the vehicle operator may not be frequently requested to execute a capless cleanout procedure.

The disclosure provides support for a method including diagnosing a door seal of a capless unit of a capless refueling system by generating vacuum in the capless refueling system. A first example of the method further includes where generating the vacuum in the capless refueling system includes fluidly coupling the capless refueling system to an intake manifold of an engine. A second example of the method, optionally including the first example, further includes where the diagnosing comprises determining the door seal passes in response to only one inflection point being sensed during the diagnosing, wherein the only one inflection point is based on a pressure of the capless refueling system sensed by a fuel tank pressure transducer (FTPT). A third example of the method, optionally including one or more of the previous examples, further includes where the diagnosing comprises determining the door seal does not pass in response to a plurality of inflection points being sensed during the diagnosing. A fourth example of the method, optionally including one or more of the previous examples, further includes where generating vacuum in the capless refueling system includes opening flappers in the capless unit. A fifth example of the method, optionally including one or more of the previous examples, further includes where the diagnosing is initiated in response to a leak being present in an evaporative emissions system. A sixth example of the method, optionally including one or more of the previous examples, further includes indicating the leak is not due to a degraded door seal in response to the diagnostic being passed.

The disclosure provides additional support for a capless refueling system for a vehicle including a capless unit having flappers and configured to receive a nozzle of a fuel dispensing device and a controller comprising computer-readable instructions that when executed enable the controller to detect a presence of a leak in an evaporative emissions system of the vehicle, and perform a diagnostic of a door seal of the capless unit via generating vacuum in the capless unit. A first example of the capless refueling system further includes where the evaporative emissions system comprises a fuel tank pressure transducer (FTPT) configured to sense a pressure of the evaporative emissions system. A second example of the capless refueling system, optionally including the first example, further includes where the door seal passes the diagnostic in response to only one pressure inflection point being sensed during the diagnostic. A third example of the capless refueling system, optionally including one or more of the previous examples, further includes where the instructions enable the controller to indicate the leak is not due to the door seal. A fourth example of the capless refueling system, optionally including one or more of the previous examples, further includes where the door seal does not pass the diagnostic in response to a plurality of pressure inflection points being sensed during the diagnostic. A fifth example of the capless refueling system, optionally including one or more of the previous examples, further includes where the instructions enable the controller to indicate the leak is due to the door seal and requesting cleaning or replacement of the door seal. A sixth example of the capless refueling system, optionally including one or more of the previous examples, further includes where the evaporative emissions system is sealed from atmosphere and fluidly coupled to an intake manifold of an engine of the vehicle during the diagnostic. A seventh example of the capless refueling system, optionally including one or more of the previous examples, further includes where the flappers actuate in the presence of vacuum.

The disclosure provides further support for a method including responsive to a leak detected in an evaporative emissions system of an engine, sealing the evaporative emissions system from atmosphere, generating vacuum in the evaporative emissions system and the a capless refueling system comprising a capless unit, monitoring a pressure of the evaporative emissions system, and determining a condition of a door seal of the capless unit based on a number of pressure inflection points detected. A first example of the method further includes where determining the condition of the door seal comprises determining the door seal is degraded in response to the number of pressure inflection points detected being greater than one. A second example of the method, optionally including the first example, further includes where determining the condition of the door seal comprises determining the door seal is not degraded in response to the number of pressure inflection points detected being equal to one. A third example of the method, optionally including one or more of the previous examples, further includes where the engine is on during the diagnostic. A fourth example of the method, optionally including one or more of the previous examples, further includes requesting maintenance of the door seal in response to determining the condition of the door seal to be degraded.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
diagnosing a door seal of a capless unit of a capless refueling system by generating vacuum in the capless refueling system; and
determining the door seal passes in response to only one inflection point being sensed during the diagnosing, wherein the only one inflection point is based on a pressure of the capless refueling system sensed by a fuel tank pressure transducer (FTPT).

2. The method of claim 1, wherein generating the vacuum in the capless refueling system includes fluidly coupling the capless refueling system to an intake manifold of an engine.

3. The method of claim 1, wherein the diagnosing comprises determining the door seal does not pass in response to a plurality of inflection points being sensed during the diagnosing.

4. The method of claim 1, wherein generating vacuum in the capless refueling system includes opening flappers in the capless unit.

5. The method of claim 1, wherein the diagnosing is initiated in response to a leak being present in an evaporative emissions system.

6. The method of claim 5, further comprising indicating the leak is not due to a degraded door seal in response to the diagnostic being passed.

7. A capless refueling system for a vehicle, comprising:
a capless unit having flappers and configured to receive a nozzle of a fuel dispensing device; and
a controller comprising computer-readable instructions that when executed enable the controller to:
detect a presence of a leak in an evaporative emissions system of the vehicle, wherein the evaporative emissions system comprises a fuel tank pressure transducer (FTPT) configured to sense a pressure of the evaporative emissions system; and
perform a diagnostic of a door seal of the capless unit via generating vacuum in the capless unit, wherein the door seal does not pass the diagnostic in response to a plurality of pressure inflection points being sensed during the diagnostic.

8. The capless refueling system of claim 7, wherein the door seal passes the diagnostic in response to only one pressure inflection point being sensed during the diagnostic.

9. The capless refueling system of claim 8, wherein the instructions enable the controller to indicate the leak is not due to the door seal.

10. The capless refueling system of claim 7, wherein the instructions enable the controller to indicate the leak is due to the door seal and requesting cleaning or replacement of the door seal.

11. The capless refueling system of claim 7, wherein the evaporative emissions system is sealed from atmosphere and fluidly coupled to an intake manifold of an engine of the vehicle during the diagnostic.

12. The capless refueling system of claim 7, wherein the flappers actuate in the presence of vacuum.

13. A method, comprising:
responsive to a leak detected in an evaporative emissions system of an engine;
sealing the evaporative emissions system from atmosphere;
generating vacuum in the evaporative emissions system and a capless refueling system comprising a capless unit;
monitoring a pressure of the evaporative emissions system; and
determining a condition of a door seal of the capless unit based on a number of pressure inflection points detected.

14. The method of claim 13, wherein determining the condition of the door seal comprises determining the door seal is degraded in response to the number of pressure inflection points detected being greater than one.

15. The method of claim 14, wherein determining the condition of the door seal comprises determining the door seal is not degraded in response to the number of pressure inflection points detected being equal to one.

16. The method of claim 13, wherein the engine is on when generating vacuum.

17. The method of claim 13, further comprising requesting maintenance of the door seal in response to determining the condition of the door seal to be degraded.

* * * * *